United States Patent
Hamery et al.

(10) Patent No.: US 6,650,710 B1
(45) Date of Patent: Nov. 18, 2003

(54) PACKET FILTERING

(76) Inventors: Dominique Hamery, 27 boulevard Edmond Rostand, 92500 Rueil Malmaison (FR); Lionel Tranchard, 18, rue Martin Bernard, F-75013 Paris (FR); Christophe Declerck, 3, rue des Ormes Dancourt, F-28210 Senantes (FR)

( * ) Notice: Subject to any disclaimer, the term of this patent is extended or adjusted under 35 U.S.C. 154(b) by 0 days.

(21) Appl. No.: 09/554,575
(22) PCT Filed: Nov. 12, 1998
(86) PCT No.: PCT/IB98/01883
§ 371 (c)(1), (2), (4) Date: Jul. 11, 2000
(87) PCT Pub. No.: WO99/26409
PCT Pub. Date: May 27, 1999

(30) Foreign Application Priority Data

Nov. 17, 1997 (EP) ............................. 97402765

(51) Int. Cl.[7] ................................. H04N 7/12
(52) U.S. Cl. ................................. 375/240.29
(58) Field of Search .................. 375/240.01, 240.1, 375/240.15, 240.25, 240.26, 240.27, 240.28, 240.29; 348/423.1, 425.1, 425.4; 370/464, 465, 477

(56) References Cited

U.S. PATENT DOCUMENTS

| 5,420,866 A | * | 5/1995 | Wasilewski ............... 370/426 |
| 5,517,250 A | * | 5/1996 | Hoogenboom et al. 375/240.27 |
| 5,594,492 A | * | 1/1997 | O'Callaghan et al. ...... 725/151 |
| 5,598,415 A | * | 1/1997 | Nuber et al. ............... 370/474 |
| 5,600,366 A | * | 2/1997 | Schulman .................... 725/36 |
| 5,600,378 A | * | 2/1997 | Wasilewski ................. 348/468 |
| 5,602,920 A | * | 2/1997 | Bestler et al. ............... 380/212 |
| 5,619,337 A | * | 4/1997 | Naimpally .................... 386/83 |
| 5,640,388 A | * | 6/1997 | Woodhead et al. ......... 370/468 |
| 5,648,960 A | * | 7/1997 | Sakazaki et al. ............ 370/498 |
| 5,650,825 A | * | 7/1997 | Naimpally et al. ......... 348/465 |
| 5,818,539 A | * | 10/1998 | Naimpally et al. ......... 348/512 |
| 5,898,695 A | * | 4/1999 | Fujii et al. .................. 370/464 |
| 5,966,385 A | * | 10/1999 | Fujii et al. .................. 370/465 |
| 6,026,506 A | * | 2/2000 | Anderson et al. ........... 714/746 |
| 6,091,772 A | * | 7/2000 | Anderson et al. ........... 375/240 |
| 6,115,422 A | * | 9/2000 | Anderson et al. ........... 375/240 |
| 2001/0043621 A1 | * | 11/2001 | Anderson et al. ........... 370/516 |

FOREIGN PATENT DOCUMENTS

| EP | 0 668 697 A2 | 8/1995 | .......... H04N/5/926 |
| EP | 0 714 213 A2 | 5/1996 | ............ H04N/7/50 |
| EP | 0 735 776 A2 | 10/1996 | ............ H04N/7/50 |
| EP | 0 784 401 A2 | 7/1997 | ............ H04N/5/44 |
| EP | 0 785 675 A2 | 7/1997 | ............ H04N/5/44 |
| EP | 0 798 932 A2 | 10/1997 | ............ H04N/7/50 |
| EP | 0 840 518 A2 | 5/1998 | ............ H04N/7/50 |
| WO | WO 97/46007 | 12/1997 | ............ H04N/5/44 |

* cited by examiner

*Primary Examiner*—Vu Le
(74) *Attorney, Agent, or Firm*—Rosenthal & Osha L.L.P.

(57) ABSTRACT

A method of filtering a packet data stream as transmitted in a digital audiovisual transmission system characterized in that transport packet data is filtered at a first stage by a digital filter according to the characteristics of the transport packet header, selected filtered data being then passed directly to a memory element within the receiver/decoder. In a second aspect, the method comprises filtering a packet data stream characterized in that transport packet data is filtered at a first stage by a first digital filter according to the characteristics of the transport packet header, selected filtered data from the paload corresponding to a continuous flux of data then being passed to a second digital filter for a second stage of filtering.

8 Claims, 4 Drawing Sheets

PACKET FILTERING

The present invention relates to a method and apparatus for filtering a digital packet data stream as used in a digital audiovisual transmission system, in particular a packet data stream conforming to an MPEG format for a digital television system.

Conventional digital television broadcast systems transmit data in the form of discrete transport stream packets or transport packets, each packet being of a predetermined length and containing a header and a payload. The MPEG-2 standard is the currently favoured standard in this domain and sets out a predetermined format for transport packets.

The packet header comprises general descriptive data regarding the packet, whilst the payload comprises the data to be processed at the receiver. The packet header includes a packet ID or PID identifying the packet. The payload of the packet may contain audio, video or other data such as application data processed by the receiver/decoder to provide extra functions, for example to generate a program guide or other visual data that may be superimposed on the screen over the normally displayed program.

Conventionally, the incoming data stream is filtered by a receiver/decoder according to the PID of each packet. Demultiplexed visual and audio data is then passed directly to dedicated processor elements in the receiver/decoder adapted to generate real time visual and audio images respectively. Teletext and subtitle data are similarly passed directly to the general microprocessor of the receiver/decoder to generate real time teletext and subtitle displays.

Data requiring immediate processing such as visual, audio, teletext and subtitle data is communicated to an appropriate processor in the form of what is conventionally known as a packetised elementary stream or PES. This continuous flux of data, which is formed by assembling the payloads of the transport packets, itself comprises a sequence of packets, each PES packet comprising a packet header and payload. Unlike the transport packet data, the length of a PES packet is variable. The filtered PES streams are processed immediately in order to provide a real time operation.

Whilst visual, audio, teletext or subtitle data are the most common types of data defined by a PES stream, other flux type data may equally be organised as a PES stream.

In addition to PES stream data, other data not requiring immediate processing may also be contained within the payloads of the transport packets. Unlike PES data, which is treated immediately by a processor to generate a real time output, this data is typically processed in an asynchronous manner by the processor. The data is often cyclical, i.e. the functions defined by the data are called up at several intervals by a processor. An example of data of this kind is the so-called Programme Specific Information or PSI data.

In this case, the data contained in the payload of the transport packets is divided into a series of sections or tables, each including a header and a payload, the header including a table ID or TID identifying the table. After the initial PID filtering, a second stage of filtering based on the section header is used to divide out modules with the same TID, and the payloads of these modules are stored and gradually assembled in a memory element in the receiver/decoder to build up the downloaded application. Unlike PES data, the order in which the sections arrive is not important, since the application is assembled over a period of time.

An example of a conventional decoder architecture for filtering PES and PSI type data is shown in the European Patent Application EP 0735776 (Hitachi). Transport packet data is initially stored in a packet landing buffer, after which an initial stage of PID filtering is carried out. Audio and video PES data is immediately passed to audio and video decoders for real-time processing, whilst a second stage of filtering at the PSI section header or TID level is carried out for PSI data, such data being thereafter stored in a system decoder buffer.

The European Patent Application EP 0714213 (LG Electronics) describes a similar decoder architecture and, in addition, discusses the analysis of adaptation field or ADF data contained in the header of transport packets used to convey PES data.

Whilst the use of a set of assembled sections enables complex applications to be downloaded and executed by the microprocessor, the steps required in this process lead to a relatively long processing time since all tables having the same TID must be identified, filtered out and stored in the memory before the application is complete.

It is an object of the present invention to provide a method and apparatus for filtering transmitted data packets which overcomes the disadvantages of the known packet filtering systems.

According to one aspect of the present invention, there is provided a method of filtering a packet data stream as transmitted in an digital audiovisual transmission system and received by a receiver/decoder characterised in that transport packet data is filtered at a first stage by a first digital filter according to the characteristics of the transport packet header, selected filtered data then being passed directly to a memory element within the receiver/decoder.

This method of treating the packet data represents a radical departure to the conventional method, in which data filtered according to the PID packet header value is either sent directly (in the form of a PES stream) to a dedicated processor or is filtered in a second stage according to a TID or PSI header value before being assembled in the memory of the decoder.

By storing transport packet data directly after a first stage filtering, the present invention permits the direct and rapid processing of data that would otherwise have to be compiled over a period of time by assembling a series of tables etc. For example, raw or native data may be carried in the payload of the transport packet for storage in the memory and subsequent use by the main processor of the receiver/decoder.

The transport packet data may be filtered at least according to the value of a packet ID or PID within the transport packet header. However, in a preferred embodiment the data may be filtered according to other bit values within the transport packet header in addition to the value of the packet ID.

The data passed to and stored in the memory element may correspond to only a part of a transport packet, for example, the payload of a packet. Preferably, however, a complete transport packet including the packet header and payload is passed to and stored in the memory element. This facilitates later treatment of the packet data. For example, it may be desired to carry out an analysis of the transport packet header characteristics.

In the case where an MPEG-type format is used, the transport packet data is transmitted in packets of fixed size. In one advantageous embodiment, a filtered packet is passed to a memory element having the same size as the fixed packet size.

Data contained within the payload of the transport packet may itself be organised in the form of secondary packets of data each with a header and a payload. Unlike the transport packets, these secondary data packets may have a variable packet length.

In particular, in the case where the transmitted data is organised in an MPEG format, the data contained in the payload of an MPEG transport packet may be organised in the form of a packetised elementary stream or PES. This packetised elementary stream may correspond to a video, audio, teletext, subtitle or other packetised elementary stream which may be processed directly by a corresponding processor of the receiver/decoder.

In addition to passing selected packets to a memory element, the digital filter may also be used to pass selected data to a processor, e.g. to pass selected data to a visual processor to generate an image, without first being stored in a memory element.

Data may be passed to a processor for execution either directly or via a second digital filter stage. In the case where data contained in the payload of transport packets is organised in the form of secondary data packets, the second digital filter may filter the packets based on the value of one or more elements of the header of the secondary packets of data.

Data filtered by the second digital filter may be passed to an associated memory element for storage and/or to a processor for decoding after having been filtered.

According to a second aspect, the present invention comprises a method of filtering a packet data stream as transmitted in an digital audiovisual transmission system and received by a receiver/decoder characterised in that transport packet data is filtered at a first stage by a first digital filter according to the characteristics of the transport packet header, selected filtered data from the payload corresponding to a continuous flux of data then being passed to a second digital filter for a second stage of filtering.

Again, unlike known systems, the payload data subjected to the second filtering stage corresponds to a continuous flux of data, rather than, for example, a set of tabulated sections that are assembled over a period of time.

As with the first aspect of the invention, the continuous flux of data contained in the payload of transport packets may further be organised in the form of secondary data packets, the second digital filter acting to filter the packets based on the value of one or more elements of the header of the secondary packets of data.

This aspect of the present invention is particularly applicable to a method of filtering a packet data stream in which the transmitted data is organised in an MPEG format, notably in which the continuous flux of data contained in the payload of a filtered and stored MPEG packet is organised in the form of a packetised elementary stream.

As before, data filtered by the second digital filter may be passed to an associated memory element for storage and/or to a processor for execution, depending on the results of the filtering.

As will be appreciated, any of the methods of filtering packet data described above, according to either the first or second aspects of the present invention, may be carried out in parallel with other filtering of the transport packet data. In particular, filtering of transport packet data may also be carried out according to the value of the PID of the transport packet stream so as to divide out packetised elementary stream data to be sent to a corresponding processor element.

In addition, parallel filtering of transport packet data according to the value of the PID, followed by a further filtering of sections contained within the payload of a transport packet according to the value of the section header may also be carried out.

The present invention extends in one aspect to a receiver/decoder for a digital audiovisual transmission system comprising a first digital filter and memory element, characterised in that selected transport packet data is filtered at a first stage by the first digital filter according to the characteristics of the transport packet header and thereafter passed directly to the memory element.

The present invention equally extends to a receiver/decoder for a digital audiovisual transmission system comprising a first and second digital filter, characterised in that transport packet data is filtered at a first stage by the first digital filter, selected filtered data from the payload corresponding to a continuous flux of data then being passed to the second digital filter for a second stage of filtering.

In the context of the present application the term "digital audiovisual transmission system" refers to all transmission systems for transmitting or broadcasting primarily audiovisual or multimedia digital data. Whilst the present invention is particularly applicable to a broadcast digital television system such as a satellite, terrestrial or cable television system, the present invention may equally be used in filtering data sent by a fixed telecommunications network for multimedia internet applications, combination telecommunication and broadcast systems etc.

The term MPEG refers to the data transmission standards developed by the International Standards Organisation working group "Motion Pictures Expert Group" and notably the MPEG-2 standard developed for digital television applications and set out in the documents ISO 13818-1, ISO 13818-2, ISO 13818-3, and ISO 13818-4. In the context of the present patent application, the term includes all variants, modifications or developments of the basic MPEG formats applicable to the field of digital data transmission.

Similarly, whilst the description refers to "receiver/decoders" and "decoders" it will be understood that the present invention applies equally to embodiments having a receiver integrated with the decoder as to a decoder unit functioning in combination with a physically separate receiver, as well as decoder units incorporating other functionalities such as web browsers or decoders integrated with other devices, such as video recorders, televisions etc.

There will now be described, by way of example only, a preferred embodiment of the present invention, with reference to the attached figures, in which.

Figure 1:
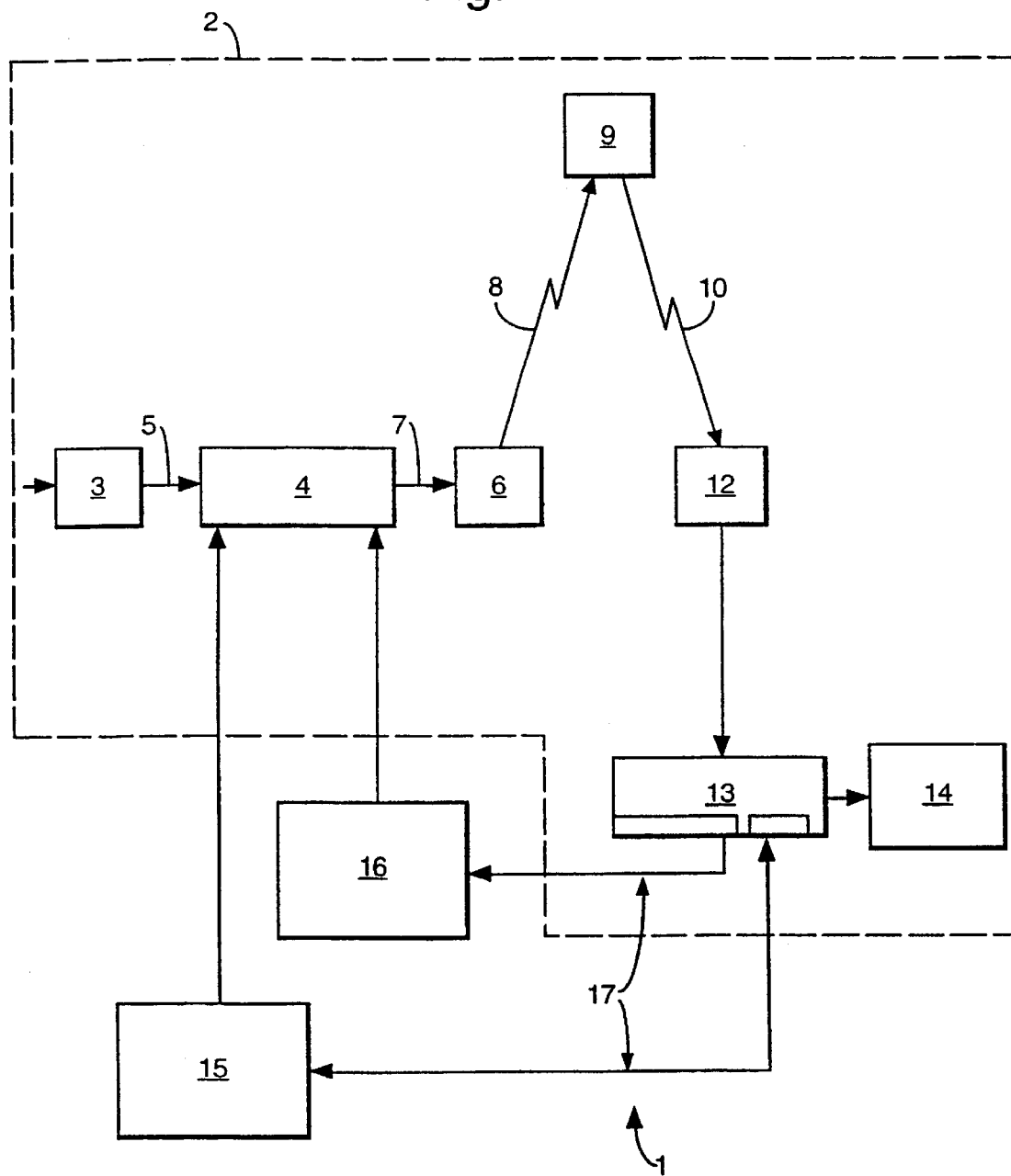
FIG. 1 shows an overview of a digital television system.

An overview of a digital television system 1 according to the present invention is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent of the exploitation key stored on a smart card inserted in the decoder to decrypt the encrypted control word and thereafter descramble the transmitted data. A paid-up subscriber will receive, for example, in a broadcast monthly ECM (Entitlement Control Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
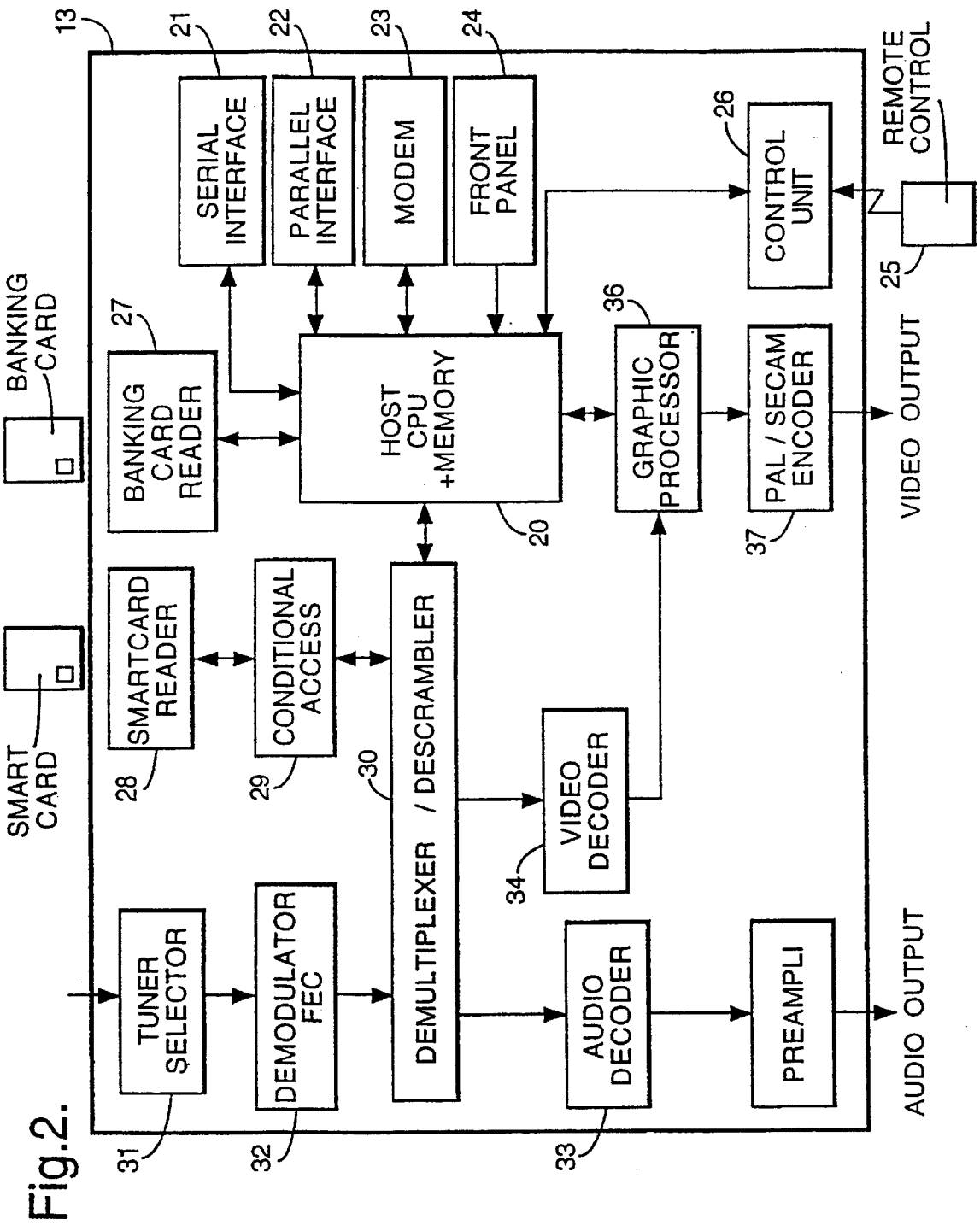
FIG. 2 shows the elements of a receiver/decoder for use in a digital television system.

Referring to FIG. 2, the elements of the receiver/decoder 13 or set-top box adapted to be used in the present invention will now be described. The elements shown in this figure will be described in terms of functional blocks.

The decoder 13 comprises a central processor 20 including associated memory elements and adapted to receive input data from a serial interface 21, a parallel interface 22, a modem 23 (connected to the modem back channel 17 of FIG. 1), and switch contacts 24 on the front panel of the decoder.

The decoder is additionally adapted to receive inputs from an infra-red remote control via a control unit 26 and also possesses two smartcard readers 27, 28 adapted to read bank or subscription smartcards 29, 30 respectively. The subscription smartcard reader 28 engages with an inserted subscription card 30 and with a conditional access unit 29 to supply the necessary control word to a demultiplexer/ descrambler 30 to enable the encrypted broadcast signal to be descrambled. The decoder also includes a conventional tuner 31 and demodulator 32 to receive and demodulate the satellite transmission before being filtered and demultiplexed by the unit 30.

Processing of data within the decoder is generally handled by the central processor 20. The software architecture of the central processor may correspond to that used in a known decoder and will not be described here in any detail. It may be based, for example, on a virtual machine interacting via an interface layer with a lower level operating system implemented in the hardware components of the decoder. In terms of the hardware architecture, the decoder will be equipped with a processor, memory elements such as ROM, RAM, FLASH etc. as in known decoders.

In the case of received audio and video signals, and as will be described in more detail below, the MPEG packets containing these signals will be demultiplexed and filtered so as to pass real time audio and video data in the form of a packetised elementary stream (PES) of audio and video data to dedicated audio and video processors or decoders 33, 34. The converted output from the audio processor 33 passes to a preamplifier 35 and thereafter via the audio output of the receiver/decoder. The converted output from the video processor 34 passes via a graphic processor 36 and PAL/ SECAM encoder 37 to the video output of the receiver/ decoder.

The graphic processor 36 additionally receives graphic data for display (such as generated images etc) from the central processor 20 and combines this information with information received from the video processor 34 to generate a screen display combining moving images together with overlaid text or other images.

In the case of received teletext and/or subtitle data, the conversion of the real time PES data to generate the appropriate images may also be handled by dedicated processors. However, in most conventional systems, this is handled by the processor 20.

The processing of the filtered audiovisual and teletext/ subtitle data to generate the necessary image and sound data is conventional and need not be described in any further detail.

Figure 3:
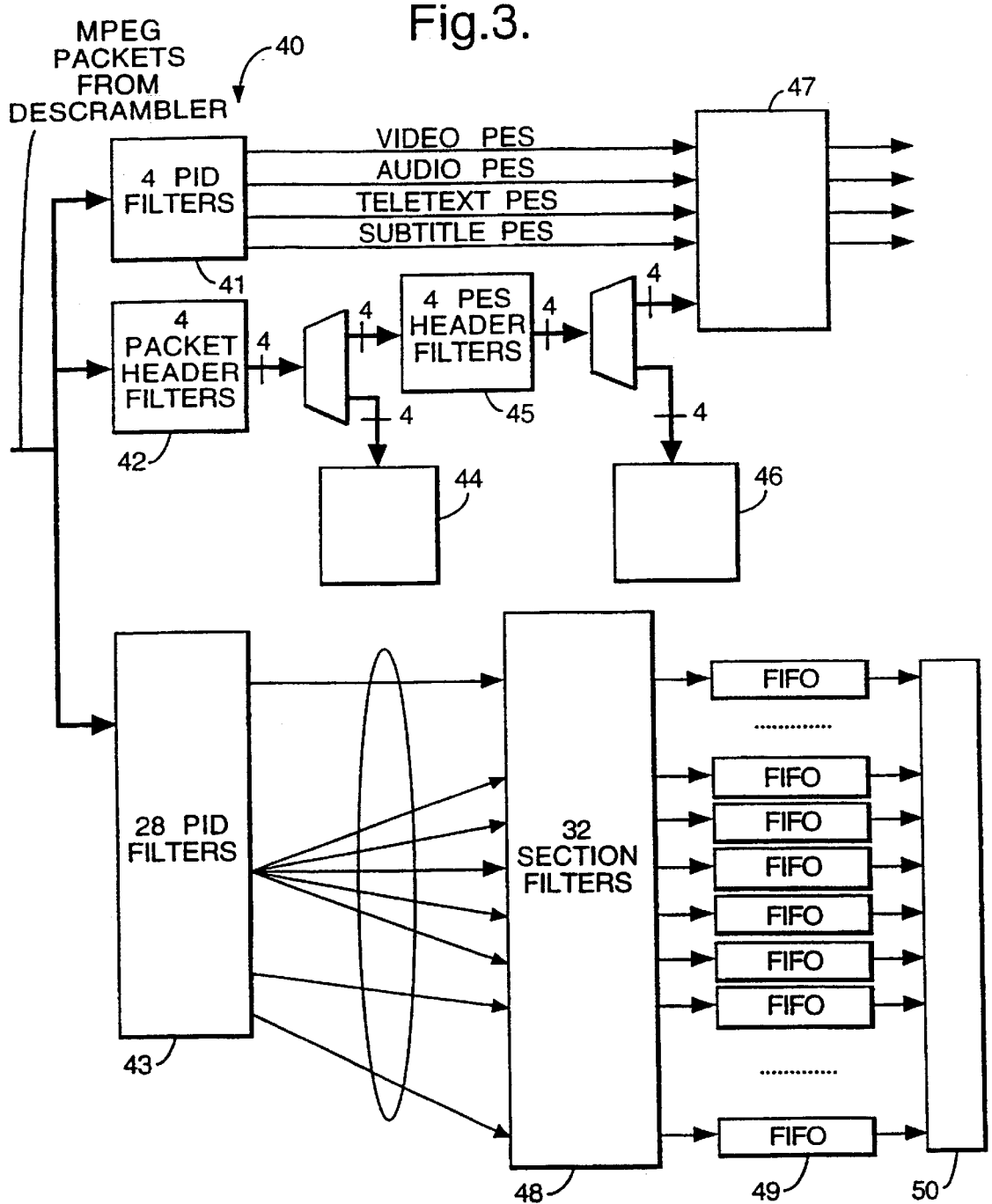
FIG. 3 shows the digital filters used in the decoder of FIG. 2 to filter packet data according to this embodiment of the present invention.
Figure 4:
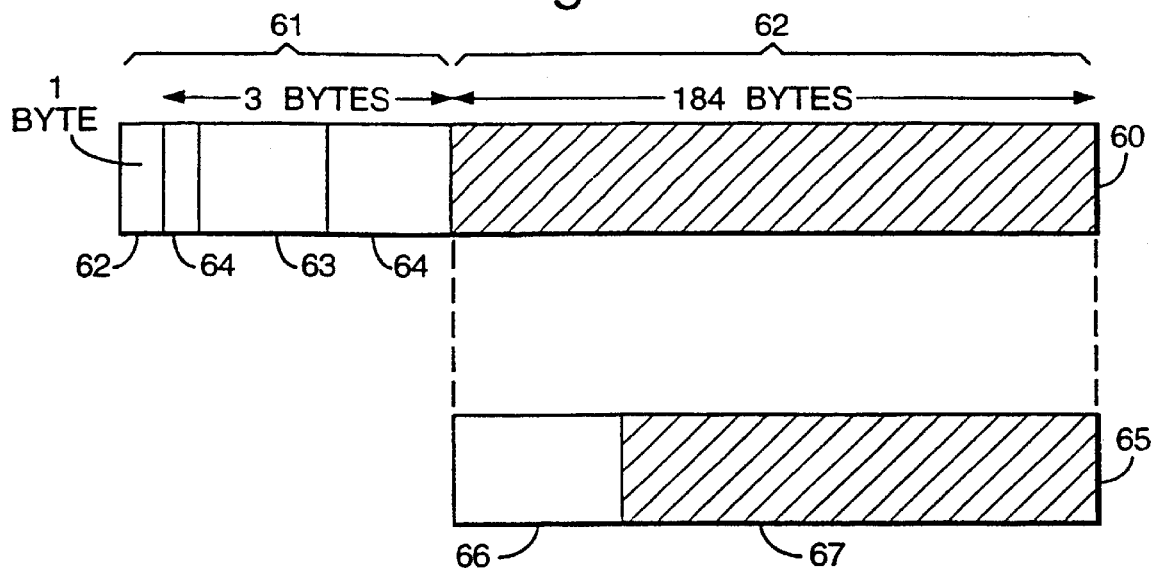
FIG. 4 shows the structure of data packets within the transmitted data stream as well as the structure of data contained within the payload of such packets.

Referring now to FIGS. 3 and 4, a system of filtering packet data within the demultiplexer 30 will now be described. In FIG. 3, descrambled MPEG packets arriving from the descrambler part of the demultiplexer (not shown) are passed by a first stage of digital filters 40. This stage of filters comprises a standard set of four PID filters 41 for extracting visual, audio, teletext and subtitle data, four packet header filters 42 for extracting MPEG packets having predetermined header characteristics, and a further conventional twenty eight PID filters for extracting MPEG packets of a predetermined PID value.

Referring to FIG. 4, the structure of a standard MPEG-2 packet 60 of transmitted data is shown. The packet has a fixed length of 188 bytes and comprises a header 61 and a payload 62. The header 61 has a fixed size of 4 bytes (32 bits). The payload has a length of 184 bytes (1472 bits).

The first byte 62 of the header comprises synchronisation data, the remaining 3 bytes (24 bits) being occupied by a packet ID or PID section 63 and other data 64. The PID section has a length of 13 bits, the other data occupying the remaining 11 bits.

In detail in a standard MPEG packet, the 3 header bytes following the synchronisation data comprise:

| | |
|---|---|
| Transport error indicator | 1 bit |
| Payload unit start indicator | 1 bit |
| Transport priority | 1 bit |
| PID | 13 bits |
| Transport scrambling control | 2 bits |
| Adaptation field control | 2 bits |
| Continuity counter | 4 bits |

Referring back to FIG. 3, the filters 41 for extracting the video, audio etc data streams carry out a filtering process based solely on the value of the bits within the PID section 63. For this reason, the filters have a size of 13 bits, corresponding to the size of this section.

As in conventional MPEG systems, certain transport packets at reserved PID addresses contain information regarding the PID addresses of audio packets, visual packets etc. This information enables the filters 41 to extract the correct packets for subsequent processing. Once the transport packet header is removed, the extracted PES streams contained in the payload and filtered out by these filters are passed directly to the appropriate processors for real time conversion to image and sound data.

By way of contrast, the filters 42 according to this embodiment of the invention carry out a filtering of data based on the whole of the packet header 63, 64 including the PID section 63 but excluding the synchronisation byte 62. For this reason, the filters 42 each have a size of 24 bits or 3 bytes.

As with all conventional digital filters, the filters 42 can be pre-set to recognise the presence or absence of a given bit or to ignore the value of a bit at a particular location by masking this bit. The filters 42 may be implemented in a fixed hardware circuit or by means of a dedicated programmable processor operating with an embedded software program. The characteristics of the digital filters 42 can be pre-programmed by the central control unit of the receiver/decoder and may be changed as desired.

In the present embodiment, four filters 42 have been indicated. For ease of representation, the four data streams emerging from the output of the filters have been shown as a single data flow. In other embodiments other numbers of such filters may be provided in parallel.

Depending on the outcome of the filtering process, some of the data may be passed to and stored in a dedicated memory element 44, for example a RAM element. Alternatively, a predetermined space in the general memory of the receiver/decoder may be allocated to the storage of this data. In this embodiment, the whole of a received and filtered MPEG packet of data is stored in the memory element 44, which has a corresponding size of 188 bytes. In alternative arrangements, only the 184 byte payload of the MPEG packet may be stored. As before, four such buffer elements will be provided for each of the four filters.

Data may be stored in the memory element according to either a simple mode, where only the first matching packet is stored, the remaining filtered packets being ignored, or a repeat mode where each matching packet is stored in the memory, a new packet erasing a previously stored packet.

Once stored in the memory element 44, such data may be called up and processed at will by the receiver/decoder. For example, the payload of the trasport packet may contain raw or native code to be executed by elements of the decoder. Alternatively, it may be desired to analyse the characteristics of the header of the transport packet.

Unlike known systems for extracting and storing data modules arranged in a fixed table form (see the description below of PID filters 42 and the subsequent processing), the filter stage 42 is particularly adapted to filtering and storing transport packets containing PES data, such as video or audio PES data, as it arrives in one sequential block. As will now be described, instead of passing a transport packet to the memory 44, the filter 42 may remove the transport packet header and send the PES data contained in the payload to a second digital filter 45.

Referring to FIG. 4, the lower illustration represents PES data packet 65 that may be carried in one or more payloads 62 of an MPEG packet 60. Unlike an MPEG packet, a PES packet is of variable length and one PES packet may be carried in a plurality of transmitted MPEG packets.

The PES packet comprises a header section 66 and payload 67. The header section 66 of a PES packet breaks down as follows:

| | |
|---|---|
| Packet start code prefix | 3 bytes |
| Stream identifier | 1 byte |
| PES packet length | 2 bytes |
| Flag Field | 2 bytes |
| Optional Fields | (variable length) |
| Stuffing bytes | (variable length) |

In the present case, the elements of the PES header that are to be considered in the second stage filtering process and their maximum value are:

| | |
|---|---|
| From the Flag field: | |
| Flags | 8 bit max |
| From the Optional Fields: | |
| PTS fields | 33 bit max |
| DTS fields | 33 bit max |
| DSM trick mode field | 8 bit max |

The meaning of each of the fields relates to the field of digital broadcasting and will be known to one skilled in the art. The term "PTS" refers to the "Presentation Time Stamp" and determines the relative timing of display of data in that packet, "DTS" refers to "Decoder Time Stamp" and determines the relative timing of processing of data, and "DSM Trick Mode" is used to treat the data in a particular manner, e.g. by freezing a frame, repeating a frame etc. The term "Flag fields" refers a set of flags indicating the presence or absence of certain information. In the present case, filtering is only carried out on half the available flags in the flag field.

Referring to FIG. 3, in order to correctly filter data based on the PES Header values described above, the second filter 45 needs to have a size of 82 bits corresponding to the maximum size of all the above values. The filtering process can be carried out on an "OR" basis, i.e. if any of the fields (flag, PTS, DTS, DSM Trick Mode) are present the PES stream may be sent to a memory element 46 or via a switch element 47 to the dedicated processor element for real time processing and presentation. As before, filtering may be carried out according to known digital filtering techniques; masking, comparison of a field to a given maximum/minimum value etc.

As described above, the filtering at the filter 45 has been carried out in relation to the PES header. However, in other embodiments, the filtering may carried out in relation to the payload. In such a case, the system operator defines the characteristics of the payload to permit filtering, for example, by defining a number of predetermined fields after the end of the header that may be identified and filtered by the filter 45 etc.

The memory 46 may have any value sufficient to store a useful amount of PES data. In the present case, a memory of 1024 bytes has been chosen.

The switch element 47 is needed in order to prevent overloading a given processor. As described above, the filtering stages 42, 45 work in parallel with the filters 41. In the case where the filters 42,45 are set up to direct a given PES stream (for example, a video PES stream) to a processor for immediate real time processing, it is necessary to inhibit the supply of the same data stream type (for example, the video PES exiting from the filters 41) to the same processor.

In addition to the filters 41, 42, the present embodiment also includes a further set of PID filters 43 adapted to identify and process downloaded application data stored in the form of sections within the payload of the MPEG packet. Application data identified by the PID filters 43 is routed via further set of thirty two section filters 48 which carry out a further filtering operation based on the value of the section header including the table ID present in the header of the tables within the MPEG packet payload. The filtered tables are then passed via FIFO buffers 49 to be assembled in the processor memory 50.

As mentioned in the introduction, this filtering of data by table ID is in itself known and described, for example, in the pending patent application PCI/EP97/02114 filed in the name of the present applicants. As such, it need not be described in any further detail.

What is claimed is:

1. A method of filtering a stream of transport data packets transmitted in a digital audiovisual transmission system, comprising:

a step of extracting from the stream of transport data packets a first particular stream of data packets by a first digital filter based on predetermined information in a transport packet header, wherein thereby the first particular stream of data packets comprises a continuous flux of data in which data packets of the first particular stream of data packets each comprise a first packet header and a first payload, wherein the first payload comprises a second packet header and a second payload; and a step of extracting from the first particular stream of data packets a second particular stream of data packets by a second digital filter based on predetermined information in the second packet headers, wherein the first particular stream of data packets is directly passed from the first digital filter to the second digital filter.

2. A method of filtering a stream of transport data packets as claimed in claim 1 in which a transport data packet is filtered at least according to a value of a packet ID within the transport packet header.

3. A method of filtering a stream of transport data packets as claimed in claim 1 in which a transport data packet is filtered according to other bit values within the transport packet header in addition to the value of a packet ID within the transport packet header.

4. A method of filtering a stream of transport data packets as claimed in claim 1 in which the transport data packets are organized in an MPEG format.

5. A method of filtering a stream of transport data packets as claimed in claim 1 in which the continuous flux of data is organized in the form of a packetized elementary stream.

6. A method of filtering a stream of transport data packets as claimed in claim 1 in which the second particular stream of data packets is passed to one of an associated memory element and a processor for execution.

7. A method of filtering a stream of transport data packets as claimed in claim 1 in which the method is carried out in parallel.

8. A receiver for receiving data transmitted in an audiovisual transmission system, comprising:

a first digital filter arranged to extract a first set of particular data packets from a plurality of data packets in an input data stream based on predetermined information in headers of the plurality of data packets;

a second digital filter arranged to extract a second set of particular data packets from the first set of particular data packets based on predetermined information in data packets in the first set of particular data packets, wherein the first set of particular data packets is directly passed from the first digital filter to the second digital filter; and at least one memory element arranged to store the second set of particular data packets.

* * * * *